US012561130B2

(12) United States Patent
Chen et al.

(10) Patent No.: US 12,561,130 B2
(45) Date of Patent: Feb. 24, 2026

(54) MAINTENANCE MODE IN HCI ENVIRONMENT

(71) Applicant: Dell Products L.P., Round Rock, TX (US)

(72) Inventors: Kai Chen, Shanghai (CN); Jun Zhan, Shanghai (CN); Stéphane Meng, Shanghai (CN); HongGang Liu, Shanghai (CN); Yuyan Chen, Shanghai (CN); Carl Shi, Shanghai (CN); Michael G. Varteresian, Lexington, MA (US)

(73) Assignee: Dell Products L.P., Round Rock, TX (US)

( * ) Notice: Subject to any disclaimer, the term of this patent is extended or adjusted under 35 U.S.C. 154(b) by 655 days.

(21) Appl. No.: 17/971,391

(22) Filed: Oct. 21, 2022

(65) Prior Publication Data

US 2024/0134632 A1    Apr. 25, 2024
US 2024/0231803 A9    Jul. 11, 2024

(51) Int. Cl.
*G06F 8/656*        (2018.01)
*G06F 9/455*        (2018.01)

(52) U.S. Cl.
CPC .......... *G06F 8/656* (2018.02); *G06F 9/45558* (2013.01); *G06F 2009/4557* (2013.01); *G06F 2009/45595* (2013.01)

(58) Field of Classification Search
CPC ................. G06F 8/656; G06F 9/45558; G06F 2009/4557; G06F 2009/45595
See application file for complete search history.

(56) References Cited

U.S. PATENT DOCUMENTS

| | | | | |
|---|---|---|---|---|
| 10,983,701 B2 * | 4/2021 | Kanno | .................... | G06F 3/061 |
| 2009/0235265 A1 * | 9/2009 | Dawson | ................ | G06F 9/5088 718/104 |
| 2012/0047313 A1 * | 2/2012 | Sinha | .................... | G06F 9/5016 711/170 |
| 2019/0250946 A1 * | 8/2019 | Parameshwaran | .... | G06F 9/5088 |
| 2020/0042340 A1 * | 2/2020 | Wiggers | ................ | G06F 9/5077 |
| 2022/0156116 A1 * | 5/2022 | Yardeni | .................. | G06F 3/061 |
| 2023/0229510 A1 * | 7/2023 | Kim | ...................... | G06F 9/5088 718/104 |

* cited by examiner

*Primary Examiner* — Aimee Li
*Assistant Examiner* — An-An Ngoc Nguyen
(74) *Attorney, Agent, or Firm* — Jackson Walker L.L.P.

(57) ABSTRACT

An information handling system may include at least one processor and a memory. The information handling system may be configured to perform a maintenance operation involving a plurality of hosts of an information handling system cluster by: determining a score for each host based on a sum of working memory sizes for all active virtual machines executing on such host plus a sum of persistent storage sizes for all virtual machines stored on such host; based on the determined scores, selecting a first host for upgrading; migrating at least a portion of all virtual machines stored on the first host from the first host to one or more other hosts; and causing the first host to perform the maintenance operation.

18 Claims, 2 Drawing Sheets

200

202 — CALCULATE MIGRATION COST
OF ALL HOSTS NOT PROCESSED

204 — SELECT THE HOST OF MINIMUM
MIGRATION COST

206 — PLACE SELECTED HOST IN
MAINTENANCE MODE

208 — PROCESS ACTIONS IN
SELECTED HOST

ALL HOSTS
PROCESSED?          NO

210

YES

END

MAINTENANCE MODE IN HCI ENVIRONMENT

TECHNICAL FIELD

The present disclosure relates in general to information handling systems, and more particularly to techniques for entering a maintenance mode in a cluster environment such as a hyper-converged infrastructure (HCI) cluster.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on a cluster of standard, off-the-shelf servers referred to as nodes or hosts. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

Nodes of an HCI system may need to enter a maintenance mode from time to time. As one example, an HCI system may undergo a lifecycle management (LCM) event to install software and firmware upgrades, and its nodes may be placed in maintenance mode during that process. In addition to LCM events, maintenance mode may be used for physical hardware upgrades, node replacement, other service events, etc.

In general, before a node enters maintenance mode, any VMs that are running on the node may need to be shut down or migrated to a different node. While a node is in maintenance mode, its resources (e.g., computing, storage, and networking resources), may be temporarily unavailable for normal workloads, and it may be unable to start new VMs. After a host exits maintenance mode, it may need data resynchronization due to ongoing cluster input/output (I/O) that has occurred during its time in maintenance mode.

It is desirable to reduce the time taken by maintenance mode. Embodiments of this disclosure provide such improvements.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with entering maintenance mode may be reduced or eliminated.

In accordance with embodiments of the present disclosure, an information handling system may include at least one processor and a memory. The information handling system may be configured to perform a maintenance operation involving a plurality of hosts of an information handling system cluster by: determining a score for each host based on a sum of working memory sizes for all active virtual machines executing on such host plus a sum of persistent storage sizes for all virtual machines stored on such host; based on the determined scores, selecting a first host for upgrading; migrating at least a portion of all virtual machines stored on the first host from the first host to one or more other hosts; and causing the first host to perform the maintenance operation.

In accordance with these and other embodiments of the present disclosure, a computer-implemented method for performing a maintenance operation involving a plurality of hosts of an information handling system cluster may include: determining a score for each host based on a sum of working memory sizes for all active virtual machines executing on such host plus a sum of persistent storage sizes for all virtual machines stored on such host; based on the determined scores, selecting a first host for upgrading; migrating at least a portion of all virtual machines stored on the first host from the first host to one or more other hosts; and causing the first host to perform the maintenance operation.

In accordance with these and other embodiments of the present disclosure, an article of manufacture may include a non-transitory, computer-readable medium having computer-executable instructions thereon that are executable by a processor of an information handling system for performing a maintenance operation involving a plurality of hosts of an information handling system cluster by: determining a score for each host based on a sum of working memory sizes for all active virtual machines executing on such host plus a sum of persistent storage sizes for all virtual machines stored on such host; based on the determined scores, selecting a first host for upgrading; migrating at least a portion of all virtual machines stored on the first host from the first host to one or more other hosts; and causing the first host to perform the maintenance operation.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
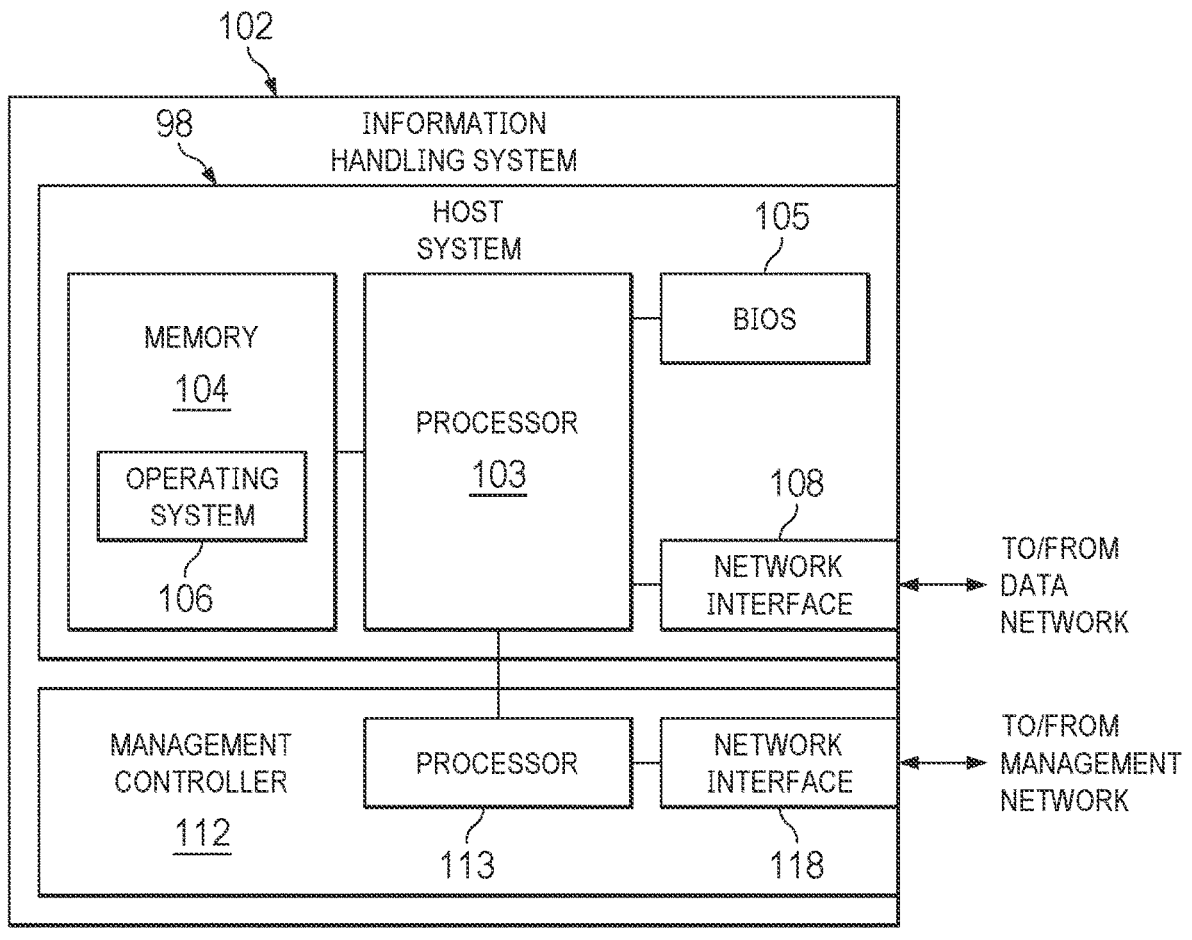
FIG. 1 illustrates a block diagram of an example information handling system, in accordance with embodiments of the present disclosure.
Figure 2:
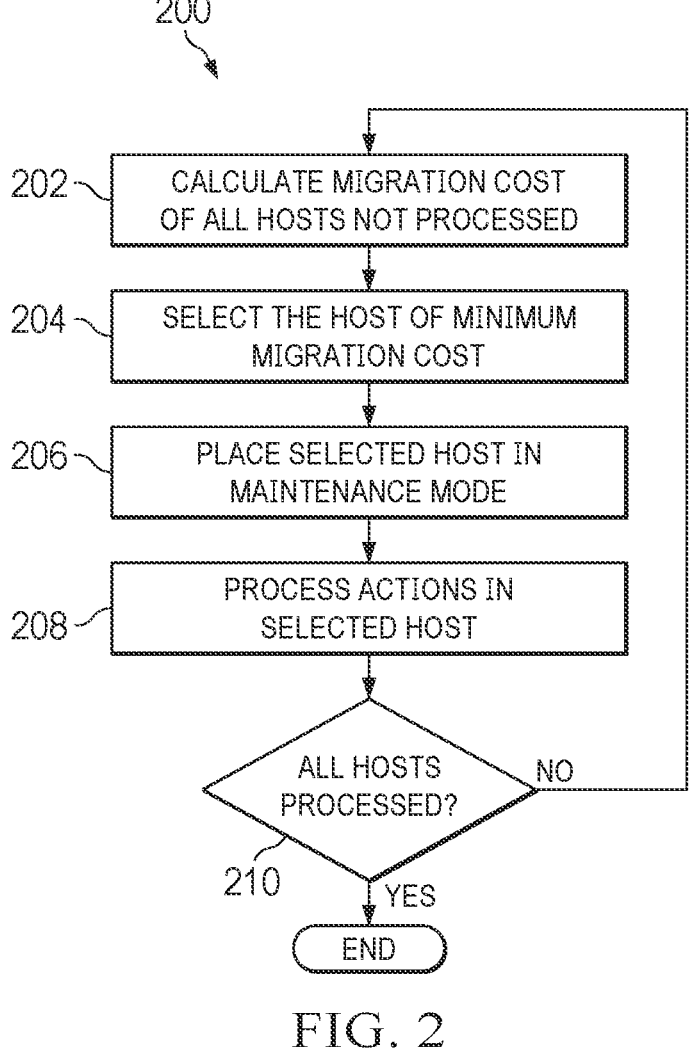
FIG. 2 illustrates an example method, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, it would be desirable to reduce the amount of time required for entering maintenance mode in a cluster of host information handling systems such as information handling system 102. Before each host in an HCI cluster is put into maintenance mode, all of the VMs executing on that host are first migrated to some other host in the cluster. VM migration may result in data migration and later data resynchronization, and so a process takes into account the cost of such operations can significantly reduce the overall time required.

In a situation in which several (e.g., all) hosts of a cluster need to enter maintenance mode, embodiments may provide techniques for calculating the cost of each host entering maintenance mode. This may allow for optimizing the order in which hosts enter maintenance mode and data synchronization operations.

Turning now to FIG. 2, a flow chart is shown of an example method 200 for causing the hosts of a cluster to enter maintenance mode, in accordance with some embodiments. For example, the hosts may be entering maintenance mode in order for some maintenance task to be completed on the cluster. In some embodiments, method 200 may be executed by an information handling system such as a node of the cluster undergoing maintenance. For example, method 200 may be executed by an HCI management system running in a VM on that cluster.

At step 202, the method calculates the migration costs for all hosts that have not yet entered maintenance mode and been processed. In one embodiment, the data migration costs may be calculated as follows. In general, the migration costs may be based on the working memory size (e.g., RAM) of the active VMs, as well as the disk size (e.g., persistent storage) of all VMs including both active and inactive VMs. The migration cost for a host H may then be given by:

$$MigrationCost(H) = \sum_{k \in Active\ VMs} MemSize(V_k) + \sum_{j \in All\ VMs} DiskSize(V_j)$$

At step 204, the method selects the host having the minimum migration cost as the next host to be placed into maintenance mode. If two hosts are determined to have the same (or approximately the same) minimum migration cost, a tie may be broken by selecting the host with lower CPU usage, or by selecting a host at random, etc.

At step 206, the selected host is placed into maintenance mode, and its VMs may be migrated to a destination host. In choosing the destination host, the method may disqualify destination hosts that are network-saturated (e.g., having more than some threshold amount of network bandwidth in use, such as 80%).

The necessary maintenance operations may then be processed on the host in maintenance mode at step 208, and the host may then be taken out of maintenance mode. At step 210, the method loops until all hosts have been processed.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
at least one processor; and
a memory;
wherein the information handling system is configured to perform a maintenance operation involving a plurality of hosts of an information handling system cluster by:
determining a score for each host based on a sum of working memory sizes for all active virtual machines executing on such host plus a sum of persistent storage sizes for all virtual machines stored on such host;
based on the determined scores, selecting a first host for upgrading;
migrating at least a portion of all virtual machines stored on the first host from the first host to one or more other hosts; and
causing the first host to perform the maintenance operation.

2. The information handling system of claim 1, wherein the cluster is a hyper-converged infrastructure (HCI) cluster.

3. The information handling system of claim 1, wherein the information handling system is a particular host of the cluster.

4. The information handling system of claim 3, wherein the determining and the selecting are performed by a virtual machine executing on the particular host.

5. The information handling system of claim 1, wherein the one or more other hosts are selected based in part on network utilization of such one or more other hosts.

6. The information handling system of claim 1, wherein the maintenance operation comprises a lifecycle management event.

7. A computer-implemented method for performing a maintenance operation involving a plurality of hosts of an information handling system cluster, the method comprising:
determining a score for each host based on a sum of working memory sizes for all active virtual machines executing on such host plus a sum of persistent storage sizes for all virtual machines stored on such host;
based on the determined scores, selecting a first host for upgrading;
migrating at least a portion of all virtual machines stored on the first host from the first host to one or more other hosts; and
causing the first host to perform the maintenance operation.

8. The method of claim 7, wherein the scores are determined such that a total number of virtual machine migrations occurring during the upgrade is minimized.

9. The method of claim 7, wherein the information handling system is a particular host of the cluster.

10. The method of claim 9, wherein the determining and the selecting are performed by a virtual machine executing on the particular host.

11. The method of claim 7, wherein the one or more other hosts are selected based in part on network utilization of such one or more other hosts.

12. The method of claim 7, wherein the maintenance operation comprises a lifecycle management event.

13. An article of manufacture comprising a non-transitory, computer-readable medium having computer-executable instructions thereon that are executable by a processor of an information handling system for performing a maintenance operation involving a plurality of hosts of an information handling system cluster by:
determining a score for each host based on a sum of working memory sizes for all active virtual machines executing on such host plus a sum of persistent storage sizes for all virtual machines stored on such host;
based on the determined scores, selecting a first host for upgrading;
migrating at least a portion of all virtual machines stored on the first host from the first host to one or more other hosts; and
causing the first host to perform the maintenance operation.

14. The article of claim 13, wherein the cluster is a hyper-converged infrastructure (HCI) cluster.

15. The article of claim 13, wherein the information handling system is a particular host of the cluster.

16. The article of claim 15, wherein the determining and the selecting are performed by a virtual machine executing on the particular host.

17. The article of claim 13, wherein the one or more other hosts are selected based in part on network utilization of such one or more other hosts.

18. The article of claim 13, wherein the maintenance operation comprises a lifecycle management event.

* * * * *